(12) United States Patent
Silberman et al.

(10) Patent No.: US 6,829,246 B2
(45) Date of Patent: Dec. 7, 2004

(54) SYSTEM AND METHOD FOR EXTENDING THE RANGE OF XDSL SERVICES

(75) Inventors: Hugo Silberman, Kefar Sirkin (IL); Tsvi (Henri) Eitane, Netanva (IL); Ysakov Stein, Jerusalem (IL)

(73) Assignee: Rad Data Communications Ltd., Tel Aviv (IL)

(*) Notice: Subject to any disclaimer, the term of this patent is extended or adjusted under 35 U.S.C. 154(b) by 168 days.

(21) Appl. No.: 09/815,840

(22) Filed: Mar. 23, 2001

(65) Prior Publication Data
US 2002/0135844 A1 Sep. 26, 2002

(51) Int. Cl.[7] .............................. H04L 12/26; H04J 3/14; G06F 11/00; G08C 15/00
(52) U.S. Cl. ........................ 370/463; 370/242; 370/468; 375/222; 375/225; 725/100; 725/106
(58) Field of Search ................................. 370/463, 465, 370/493, 524, 527, 529, 535, 537; 359/117, 125, 164, 110, 123, 124, 132; 375/220, 263, 290, 225, 222; 379/93.14, 93.28

(56) References Cited

U.S. PATENT DOCUMENTS

| | | | |
|---|---|---|---|
| 4,768,188 A | 8/1988 | Barnhart et al. | |
| 4,860,287 A | 8/1989 | Kelly | |
| 4,891,694 A | 1/1990 | Way | |
| 5,029,333 A | 7/1991 | Graves et al. | |
| 5,150,247 A | * 9/1992 | Sharpe et al. | 359/135 |
| 5,440,335 A | 8/1995 | Beveridge | |
| 5,488,413 A | 1/1996 | Elder et al. | |
| 5,528,630 A | 6/1996 | Ashley et al. | |
| 5,534,912 A | * 7/1996 | Kostreski | 348/6 |
| 5,592,477 A | 1/1997 | Farris et al. | |
| 5,592,540 A | 1/1997 | Beveridge | |
| 5,594,789 A | 1/1997 | Seazholtz et al. | |
| 5,598,413 A | 1/1997 | Sansom et al. | |
| 5,613,190 A | 3/1997 | Hylton | |
| 5,644,573 A | 7/1997 | Bingham et al. | |
| 5,784,683 A | 7/1998 | Sistanizadeh et al. | |
| 5,793,413 A | 8/1998 | Hylton et al. | |
| 5,805,591 A | 9/1998 | Naboulsi et al. | |
| 5,809,033 A | 9/1998 | Turner et al. | |
| 5,825,862 A | 10/1998 | Voit et al. | |
| 5,864,748 A | 1/1999 | Dail | |
| 5,883,661 A | 3/1999 | Hoarty | |
| 5,889,856 A | 3/1999 | O'Toole et al. | |
| 5,963,844 A | 10/1999 | Dail | |

(List continued on next page.)

OTHER PUBLICATIONS

IBM Technical Disclosure Bulletin, Apr. 1981, Fiber Optical Communications Network Interface. pp. 1 and 2.
IBM Technical Disclosure Bulletin, Jul. 1988, Local Area Network Adapter, pp. 1–4.

Primary Examiner—Man Phan
(74) Attorney, Agent, or Firm—Katten Muchin Zavis Rosenman

(57) ABSTRACT

A system and method for extending the distance that xDSL services are able to be provided to subscribers. A DSLAM located at a Central Office is connected to a general-purpose network, such as the Internet. The DSLAM is additionally connected to a first fiber optic transceiver. The first fiber optic transceiver is connected via a fiber optic link to a second fiber optic transceiver located proximate to the subscribers' premises, preferably in a street cabinet. Each subscriber premise's equipment is connected to the broadband transceiver via subscriber lines. Electrical signals to be transmitted between the Central Office and the subscribers' premises are utilized to form a frequency division multiplexed signal. The frequency division multiplexed signal is used to modulate a light subcarrier for transmission across the fiber optic link. At the respective receiving transceiver, the frequency division multiplexed signal is reconverted to the electrical signals, which are then applied to the subscriber premises equipment or DSLAM, depending upon the direction of communication.

31 Claims, 6 Drawing Sheets

U.S. PATENT DOCUMENTS

| | | | |
|---|---|---|---|
| 5,987,061 A | 11/1999 | Chen | |
| 5,991,311 A | 11/1999 | Long et al. | |
| 5,999,518 A | 12/1999 | Nattkemper et al. | |
| 5,999,542 A | 12/1999 | Turner et al. | |
| 5,999,563 A | 12/1999 | Polley et al. | |
| 6,002,502 A | 12/1999 | Pomp et al. | |
| 6,002,722 A | 12/1999 | Wu | |
| 6,021,158 A | 2/2000 | Schurr et al. | |
| 6,028,867 A * | 2/2000 | Rawson et al. | 370/463 |
| 6,044,107 A | 3/2000 | Gatherer et al. | |
| 6,055,268 A | 4/2000 | Timm et al. | |
| 6,064,692 A | 5/2000 | Chow | |
| 6,075,795 A | 6/2000 | Barsoum et al. | |
| 6,081,517 A * | 6/2000 | Liu et al. | 370/352 |
| 6,091,932 A | 7/2000 | Langlais | |
| 6,097,515 A * | 8/2000 | Pomp et al. | 359/117 |
| 6,144,659 A * | 11/2000 | Nye et al. | 370/359 |
| 6,151,491 A | 11/2000 | Farris et al. | |
| 6,192,399 B1 | 2/2001 | Goodman | |
| 6,219,354 B1 * | 4/2001 | Fink et al. | 370/463 |
| 6,236,664 B1 | 5/2001 | Erreygers | |
| 6,246,716 B1 * | 6/2001 | Schneider | 375/220 |
| 6,266,348 B1 | 7/2001 | Gross et al. | |
| 6,286,049 B1 | 9/2001 | Rajakarunanayake et al. | |
| 6,335,936 B1 | 1/2002 | Bossemeyer, Jr. et al. | |
| 6,396,910 B1 * | 5/2002 | Lazar et al. | 379/93 |
| 6,424,657 B1 * | 7/2002 | Voit et al. | 370/412 |
| 6,430,273 B1 * | 8/2002 | Shaheen | 379/93.14 |
| 6,477,595 B1 * | 11/2002 | Cohen et al. | 710/105 |
| 6,546,046 B1 * | 4/2003 | Sweitzer et al. | 375/225 |
| 6,549,520 B1 * | 4/2003 | Gross et al. | 370/242 |

\* cited by examiner

SYSTEM AND METHOD FOR EXTENDING THE RANGE OF XDSL SERVICES

BACKGROUND OF THE INVENTION

1. Field of Invention

The present invention relates generally to the field of high-speed digital signals and services provided to subscribers via installed twisted-pair circuits. More specifically, the present invention is related to a system and method of using optical fiber technology to extend the range over which such signals and services may be provided.

2. Discussion of Prior Art

The most ubiquitous medium for transport of electronic communications is the Public Switched Telephone Network (PSTN), which was designed to provide two-way analog voice communications. This same network is capable of being used for digital communications by employing traditional "modems," but fundamental physical constraints severely limit the speed reliably attained by such devices. These restraints include the bandwidth limitations (under 4 KHz) of the PSTN and the signal-to-noise ratio (about 30 dB) of the medium carrying the signals.

The signal-to-noise ratio is derived from physical properties of subscriber lines utilized to transport the analog signals between the subscriber's premises and the Central Office (CO), namely Unshielded Twisted Pairs (UTP) of copper wire. The attenuation of the desired signals in these wires, and the pickup of various undesired noises by these wires, result in limited signal-to-noise-ratio, and ultimately to restriction of the length of UTP which can be deployed.

The bandwidth limitation is derived from the fact that the PSTN was designed for voice transmission. Early telephones could only provide 4 KHz of bandwidth, a bandwidth sufficient for basic speech communications. Enforcing low bandwidth increases the efficiency of both Frequency Domain Multiplexing (FDM) analog systems and Time Domain Multiplexing (TDM) digital systems which carry multiple conversations on a single cable.

The 4 KHz bandwidth constraint is imposed by the network and is not a limitation of the subscriber lines themselves. Direct connection to the UTP affords much higher bandwidth and hence support for much higher rate digital communications. Recently, technologies termed collectively Digital Subscriber Line (DSL) have been employed to exploit these higher rates. The different variants of DSL are collectively referred to as xDSL (e.g. HDSL, ADSL and VDSL).

A typical xDSL system is illustrated in FIG. 1. At the CO there is a DSL access multiplexer (DSLAM) 100, which contains a bank of xDSL Terminal Units (xTU) and a mechanism for combining all the digital information to and from these xTUs into a single information stream in order to interface with a high-speed network, such as the Internet. At the other end of the subscriber lines 102a–102e are individual remote Terminal Units 104a–104e located at the subscriber's premises. In order to differentiate between xTUs based on location, CO-based xTUs are typically designated xTU-C, while remote xTUs are designated xTU-R. Each xTU-R communicates with a corresponding xTU-C of DSLAM 100, extracting the digital information contained in the xDSL signal and forwarding it to the premises distribution network.

As aforementioned, xDSL technologies provide high-speed digital communications by exploiting frequencies within the physical bandwidth of the subscriber lines 102a–102e, but above the 4 KHz utilized by the Plain Old Telephone Service (POTS). For example, standard ADSL uses frequencies between about 30 KHz to about 1104 KHz; the lower portion of this spectrum (up to 138 KHz) being for upstream transmission from the subscriber, and the upper portion for downstream transmission to the subscriber.

Due to the attenuation of signals in UTP lines becoming stronger with increasing frequency, xDSL technologies which utilize very high frequencies are subject to extremely high attenuation factors. In addition, unwanted pickup of radiation from adjacent lines, a phenomenon known as cross-talk, also becomes more pronounced with increasing frequency. Because of these effects the signal-to-noise-ratio declines rapidly with increasing frequency. Conversely, as the distance from the subscriber to the CO increases, achievable data rates diminish. The maximum distance obtainable by the xDSL technology at a given data rate is called its maximum reach. The maximum reach of ADSL at 1.5 Mbps downstream is typically about 18 Kft (5.5 Km); for ADSL at 8 Mbps downstream this is reduced to about 11 Kft (3.3 Km); while VDSL at 52 Mbps downstream has a maximum reach of only 1 Kft (300 m).

xDSL service providers wish to provide the highest data rates to as many customers as possible. Unfortunately, because of the physical properties of UTP subscriber lines just described, these two aims are mutually incompatible. Higher data rates can only be achieved for shorter distances, thus restricting the number of reachable subscribers. Present xDSL technologies can supply the highest rates (e.g. VDSL) only to subscribers serviced by short lengths of UTP, lower rates (ADSL, HDSL) to more distant customers, and must declare distant customers ineligible for any type of xDSL access.

One solution proposed to this problem is so-called Fiber To The Cabinet (FTTC), scenario depicted in FIG. 2. With FTTC, digital data is transferred over fiber optic cable 202 from the CO 200 to a street cabinet containing the DSLAM 204. Subscriber lines 206a–206e from the cabinet to the xTU-Rs 208a–208e at the subscribers' premises are kept to minimal lengths, thus enabling the highest data rates to be obtained. This scenario, and similar ones such as Fiber To The Basement (FTTB), are commonly used for VDSL service.

However, FTTC is not a fully satisfactory solution because of the inhospitality of the street cabinet environment. These cabinets obviously place restrictions on the physical size of equipment, and due to limited power and inadequate heat dissipation they severely restrict power consumption. These constraints have impeded successful mass deployment of FTTC-DSL solutions since high-speed DSL modems require sophisticated signal processing and high power digital and analog circuitry.

ADSL was originally designed for video on demand services. In this context U.S. Pat. No. 5,534,912 to Kostreski et al. suggests utilizing a fiber optic cable to extend ADSL reach. A plurality of video channels is arranged at a Central Office into ADSL format and, together with a provisioning channel, multiplexed into a composite spectrum. This composite spectrum is then transmitted to an intermediate distribution point, remote from the Central Office, over analog optical fiber. The composite spectrum is split and applied individually to channel selection mixers associated with the subscribers serviced by the intermediate distribution point. However, Kostreski et al. does not teach the use of the optical fiber to extend the range that general xDSL services (i.e., the transmission of arbitrary data) can be provided to allow additional subscribers to be reached while providing the high data rates available to users proximate to the CO to these additional subscribers. Rather, Kostreski et al., teaches the streaming of multiple video feeds via the channels to a subscriber and the provision of a video library for streaming video on demand to a subscriber utilizing one of the channels. Kostreski et al. also does not teach the connection of the DSLAM at the CO to a high-speed general-purpose network, such as the Internet, to provide subscribers the capability of general-purpose communications between their subscriber premises equipment, such as personal computers, with equipment connected to the high-speed general-purpose network.

Whatever the precise merits, features and advantages of the above cited reference, it does not achieve nor fulfill the purposes of the present invention.

SUMMARY OF THE INVENTION

A system and method for extending the range over which high-speed digital data from arbitrary communications networks can be transmitted using pairs of copper wire such as lines serving subscribers of the conventional telephone system. The digital data is assumed to be converted in the customary manner into an analog signal suitable for transmission over the line. In the present invention a broadband analog link capable of transferring signals over long distances is inserted at some point along the length of the line. In order to extend the range for multiple subscribers the analog signals destined for and emanating from the different subscribers are multiplexed in the frequency domain into a single composite analog signal for transmission over the broadband analog link.

In the preferred embodiment, the present invention utilizes an analog fiber optic link to extend the distance over which xDSL services can be provided between a Central Office (CO) and multiple subscribers' premises. We assume that a DSL access multiplexer (DSLAM), located at the Central Office, receives data from and sends data to an arbitrary digital communications network. In the downstream direction the DSLAM generates a plurality of analog signals, each of which contains the data required to be transmitted to a single DSL subscriber. A centrally located analog fiber optic transceiver connected to the DSLAM receives the plurality of signals from the DSLAM and constructs a frequency division multiplexed (FDM) signal from the plurality of signals. This FDM signal is transmitted to a remotely located fiber optic transceiver via an analog fiber optic link. At the remotely located fiber optic transceiver, the plurality of DSL signals is reconstructed from the FDM signal and each individual signal is transmitted to its corresponding DSL subscriber via the appropriate subscriber line. Similarly, in the upstream direction, the plurality of analog signals emanating from multiple DSL subscriber modems is converted into a composite FDM signal and transmitted by the remotely located fiber optic transceiver over the fiber optic link to the centrally located fiber optic transceiver. There the DSL signals are reconstructed and presented to DSLAM which extracts the digital data from each, multiplexes these data into a composite digital data stream, and forwards this digital data to the arbitrary digital communications network.

In an alternative embodiment, the present invention additionally provides Plain Old Telephone Service (POTS) to a subscriber. In one implementation of this embodiment, a POTS splitter is provided between the subscriber xDSL modem and the remotely located fiber optic transceiver. The POTS splitter separates the POTS service signal from the xDSL service signal for each subscriber line. The xDSL service signals are then transmitted via the fiber optic link to the CO as described in the preferred embodiment, while the POTS service signals are transmitted to the CO via the legacy subscriber line. In a second implementation of this embodiment, the POTS audio and signaling signals are converted to an appropriate format and sent via the fiber optic link. The supply voltage required at the subscriber premises is injected between the remotely located fiber optic transceiver and the subscriber line by appropriate circuitry.

In another embodiment of the present invention, the bandwidth of the channels in the FDM signal are dynamically set depending upon the bandwidth requirements of each particular subscriber. The configuration for the bandwidth of each channel may be set at the CO and communicated to the remotely located transceiver via a management protocol.

DESCRIPTION OF THE PREFERRED EMBODIMENTS

Figure 1:
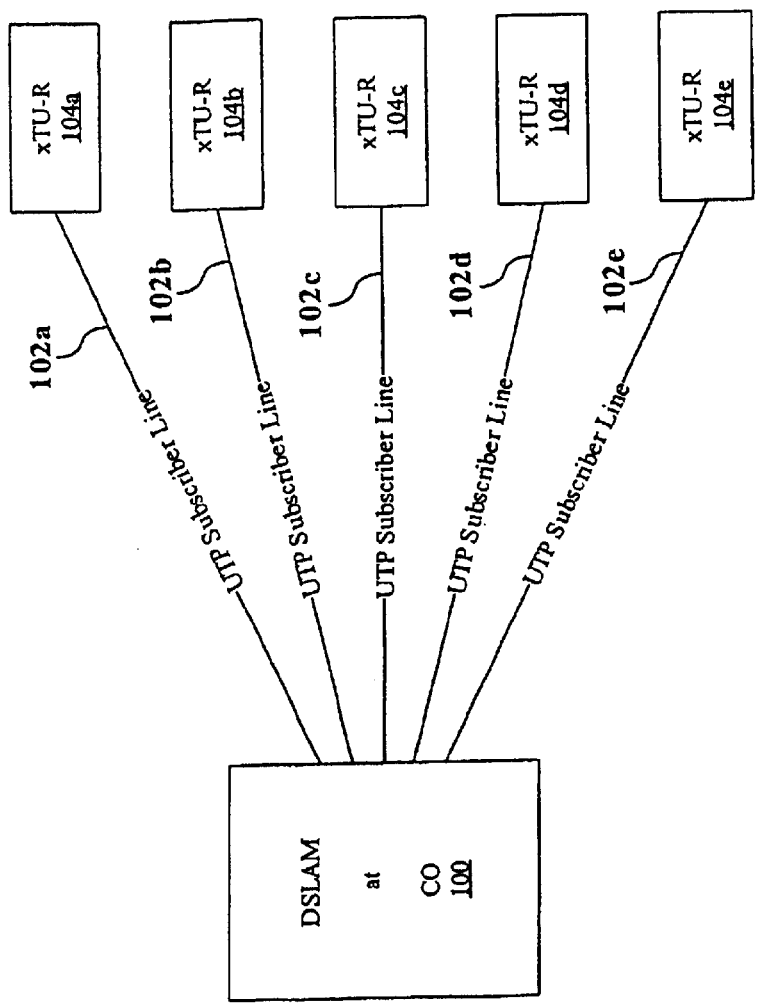
FIG. 1 illustrates conventional xDSL service employing a DSLAM at the CO.
Figure 2:
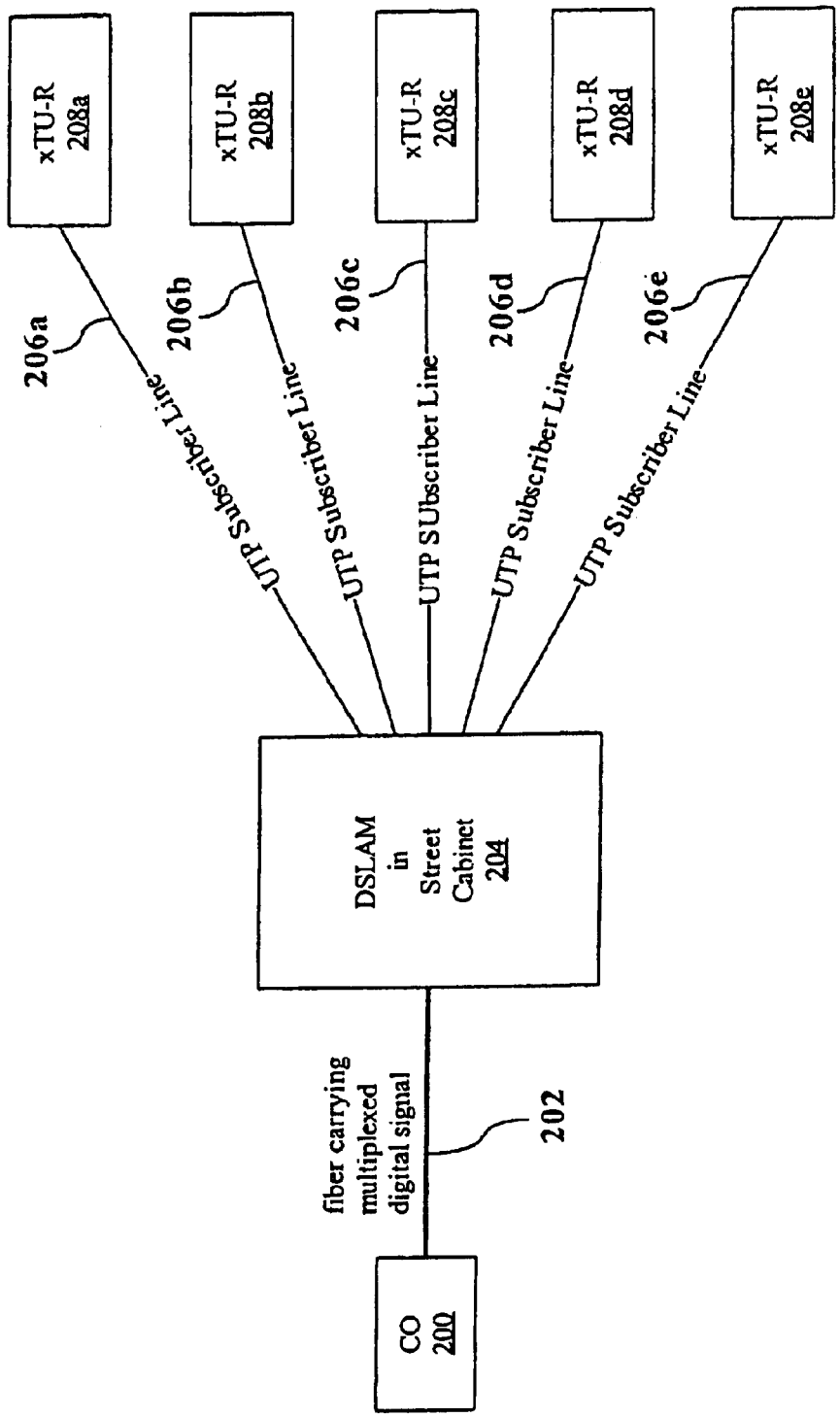
FIG. 2 illustrates the FTTC approach to xDSL employing a DSLAM in a street cabinet and an optical fiber carrying a multiplexed digital signal.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 3A:
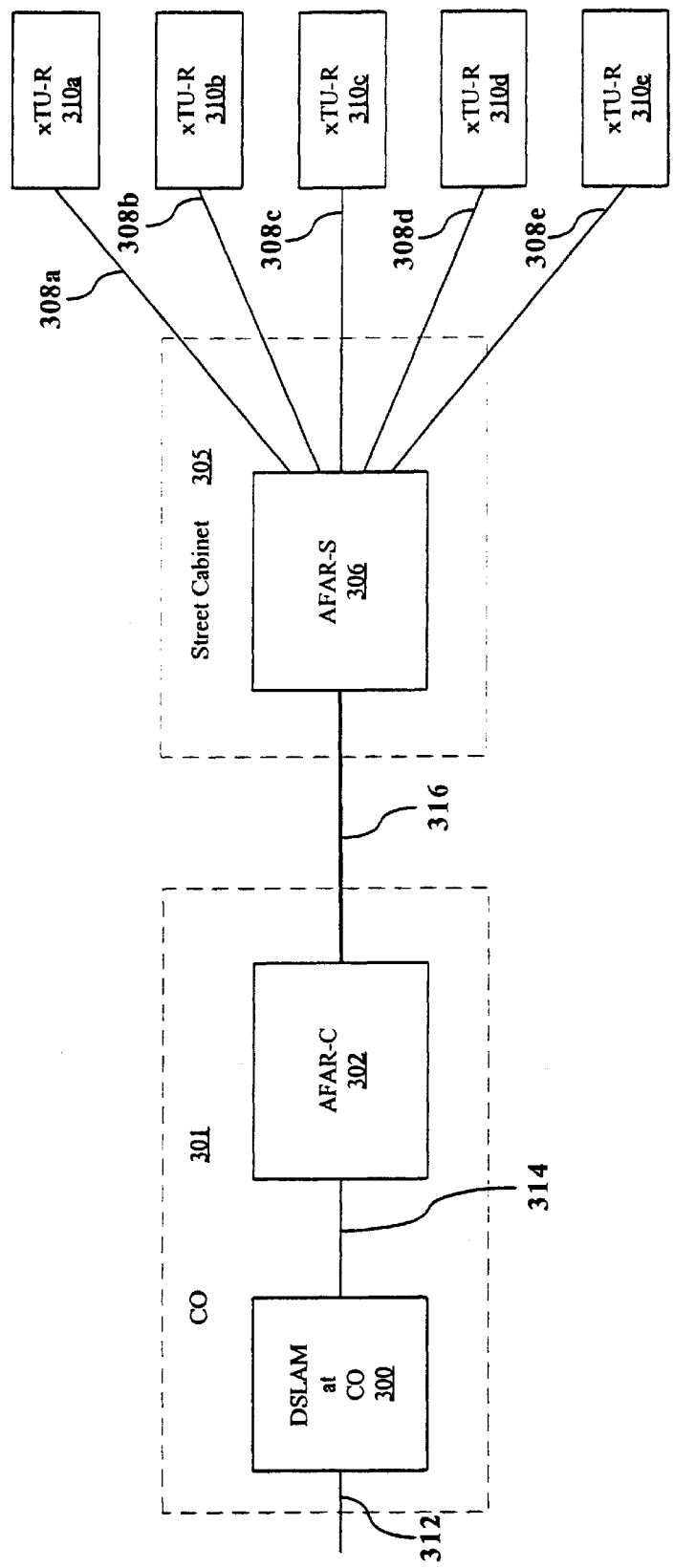
FIG. 3a illustrates the present invention for extending the range over which xDSL services are provided by utilizing an optical fiber carrying a frequency domain multiplexed analog signal.

The present invention, to extend the range of general xDSL services using a technique termed Analog Fiber for Added Reach (AFAR), is illustrated in FIG. 3a. DSLAM 300 is located at CO 301 and has a high capacity connection 312 to a high-speed general-purpose network (not shown), such as the Internet. Subscriber lines 308a–308e extend from xTU-Rs 310a–310e to a street cabinet where they are connected to a unit designated as AFAR-S 306. At AFAR-S 306, located at street cabinet 305, the upstream and downstream signals of each subscriber are separated, using a hybrid transformer or equivalent. Each of the upstream signals from the subscriber's xTU-R modulates a separate subcarrier, and the modulated signals are combined using analog summation creating a single wideband Frequency Division Multiplexed (FDM) signal. The AFAR-S contains a fiber optic transmitter which converts this FDM signal into a light beam which is sent across a fiber optic link 316 to a unit designated as AFAR-C 302, located at CO 301. Preferably, AFAR-S 306 is highly compact and power efficient as required for placement in a street cabinet.

The precise modulation technique used for the secondary modulation of the subcarriers by the upstream signals can be any appropriate technique such as AM, FM, DSB, SSB, although SSB technique is the most efficient from the bandwidth point of view. Equivalently to the SSB case, each upstream signal can be mixed up to the appropriate subcarrier and the FDM signal formed by analog summation of these signals.

In addition, in one embodiment, to increase the data transmitted via fiber optic link 316, multiple light wavelengths are used. In this case, the plurality of subscriber upstream signals are partitioned into groups, and the signals belonging to each group are combined into a respective wideband FDM signal which modulates a respective light wavelength. A large number of distinct light wavelengths and hence groups of subscriber signals can be sent over a single fiber using wavelength division multiplexing, the limitation on the total number of wavelengths depending upon the bandwidth of the fiber optic link.

Figure 4:
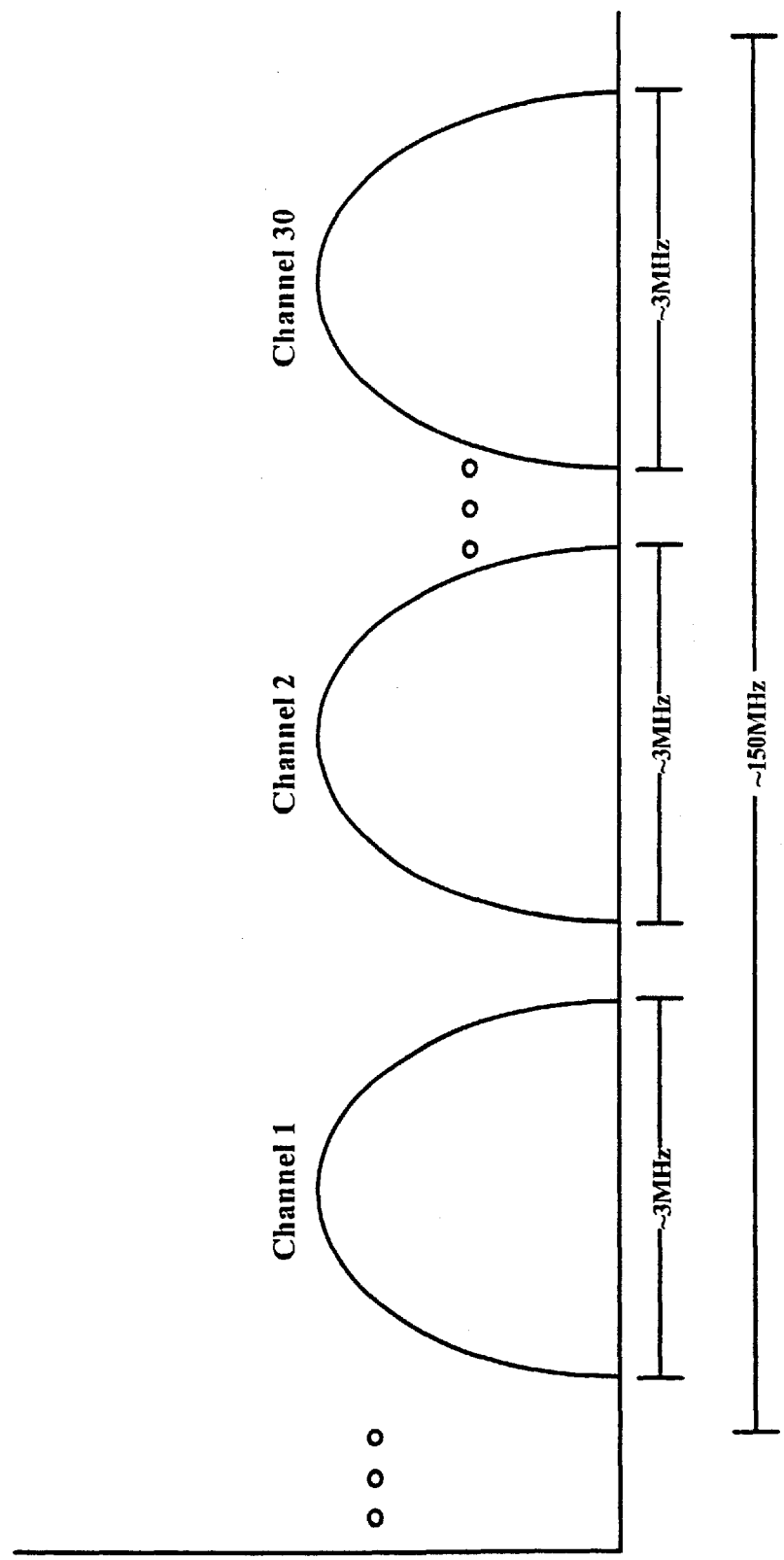
FIG. 4 illustrates a particular case of the frequency domain multiplexing wherein 30 xDSL signals occupy 150 MHz of bandwidth.

The number of subscriber upstream signals used to generate any of the FDM signals depends upon the bandwidth of the corresponding light wavelength. For instance, present LED technology is capable of providing about 150 MHz of bandwidth for the FDM signal, and assuming the system must accommodate HDSL, HDSL2 and ADSL, a bandwidth of about 3 MHz is sufficient for each subscriber signal. Therefore, allowing for guard bands, approximately thirty channels can be carried using a single light wavelength. An illustration of the spectrum for this case is shown in FIG. 4.

At the AFAR-C 302, received FDM signals are reconstituted into separate subscriber signals. These reconstituted signals are then provided to DSLAM 300 by a number of connections 314. DSLAM 300 aggregates the digital data and forwards it via high capacity link 312 to the high-speed general-purpose network.

Conversely, the downstream data from the high-speed general-purpose network arriving at DSLAM 300 is provided to AFAR-C 302 via connections 314. Similar to AFAR-S 306, at AFAR-C 302 the downstream DSL signals are combined into one or more FDM signals and transmitted to AFAR-S 306 via fiber optic link 316. At AFAR-S 306, the one or more FDM signals are separated into the original constituent signals; these signals are then placed on the appropriate subscriber line of lines 308a–308e.

In less homogenous applications of the present invention, the bandwidth requirement of subscribers may vary. For instance, some subscribers may only require relatively low-bandwidth services (e.g., HDSL2), while others require high-bandwidth services (e.g., VDSL). In these instances, it is desirable to allow AFAR-C 302 and AFAR-S 306 to configure the bandwidth allocated on a per subscriber basis. In this configuration, the devoted subscriber bandwidth is set in AFAR-C 302 and communicated to AFAR-S 306 via a management protocol.

The present system has a number of distinct advantages. Other than AFAR-S 306, AFAR-C 302 and fiber link 316, no additional equipment is needed to extend the range of general xDSL services. In particular, existing DSLAMs are utilized without change, since, except for a time delay, the analog signals seen by DSLAM 300 are the same as the signals in current systems. Similarly, standard xTU-Rs are utilized, as, except for the time delay, the analog signal seen by an xTU-R is the same as the signals in current systems. While the standard equipment is able to be used without modification, the maximum total reach of the xDSL service is extended by the length of the fiber optic link.

In addition, the present system is transparent to the precise services provided since the treatment of the subscriber channels is non-DSL-type specific. Hence, this mechanism is able to be utilized for any type of DSL signal, as long as the bandwidth provided is sufficient. In addition, the present system is capable of also transferring Plain Old Telephone Services (POTS), as well as Integrated Services Digital Network (ISDN) services.

Figure 3B:
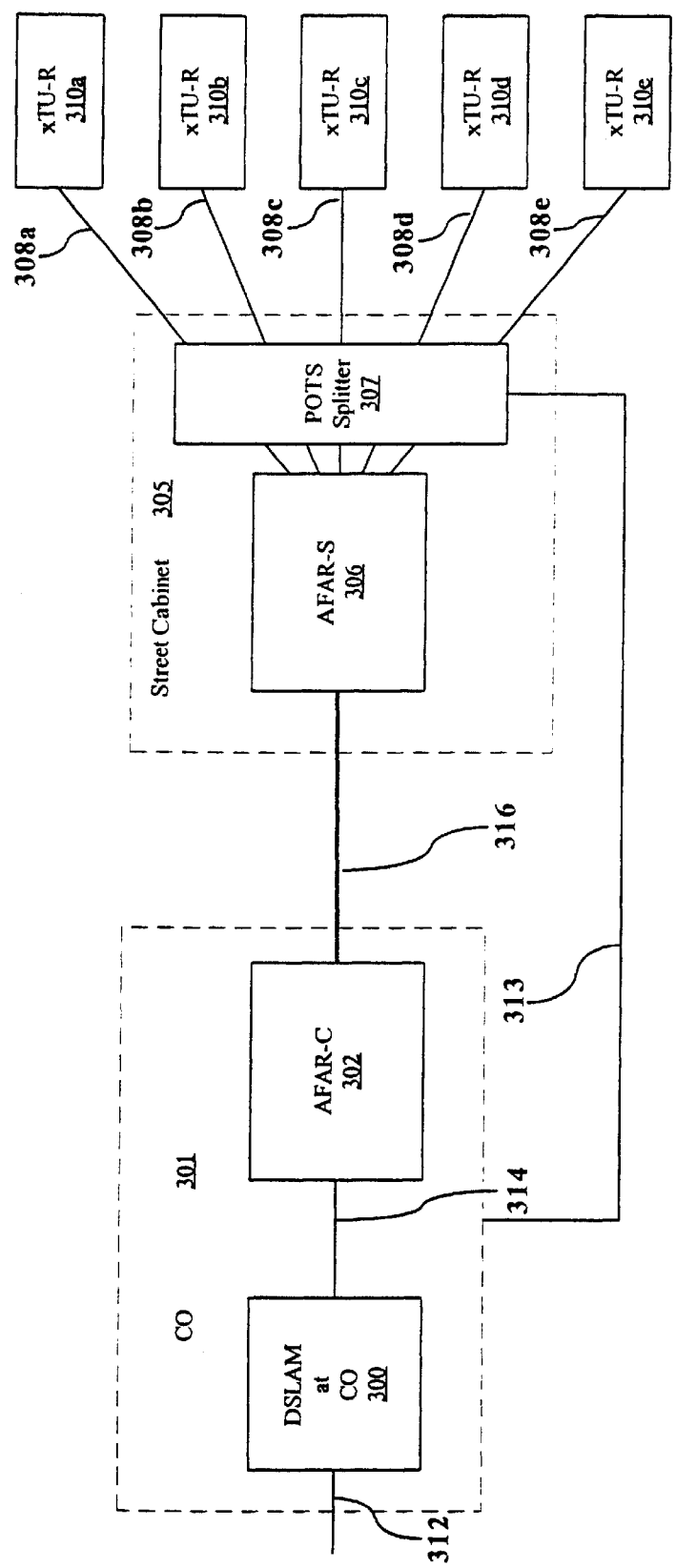
FIG. 3b illustrates the implementation of the embodiment that provides POTS service using a POTS splitter and legacy subscriber lines.

In embodiments wherein the present invention is utilized in conjunction with traditional POTS service to the subscriber, there are a number of signals that must be provided in addition to the 4 KHz audio of the POTS service. For instance, power and voltages must be provided for DC power feed, AC ring voltage and lifeline service guarantee. In one implementation, illustrated in FIG. 3b, conventional POTS services utilize the legacy UTP lines that connect the subscriber to CO 301. In this implementation, prior to AFAR-S 306 is located a POTS splitter 307 that separates the xDSL service signals from the POTS services signals. The POTS services signals are then transmitted via legacy UTP lines to CO 301, while the xDSL signals are provided to AFAR-S 306 where they are frequency division multiplexed over fiber optic link 302. In this manner, power-feed and ring voltage are supplied via legacy UTP lines 313, along with the voice signals, while the xDSL services alone are provided by the fiber link 316.

Figure 3C:
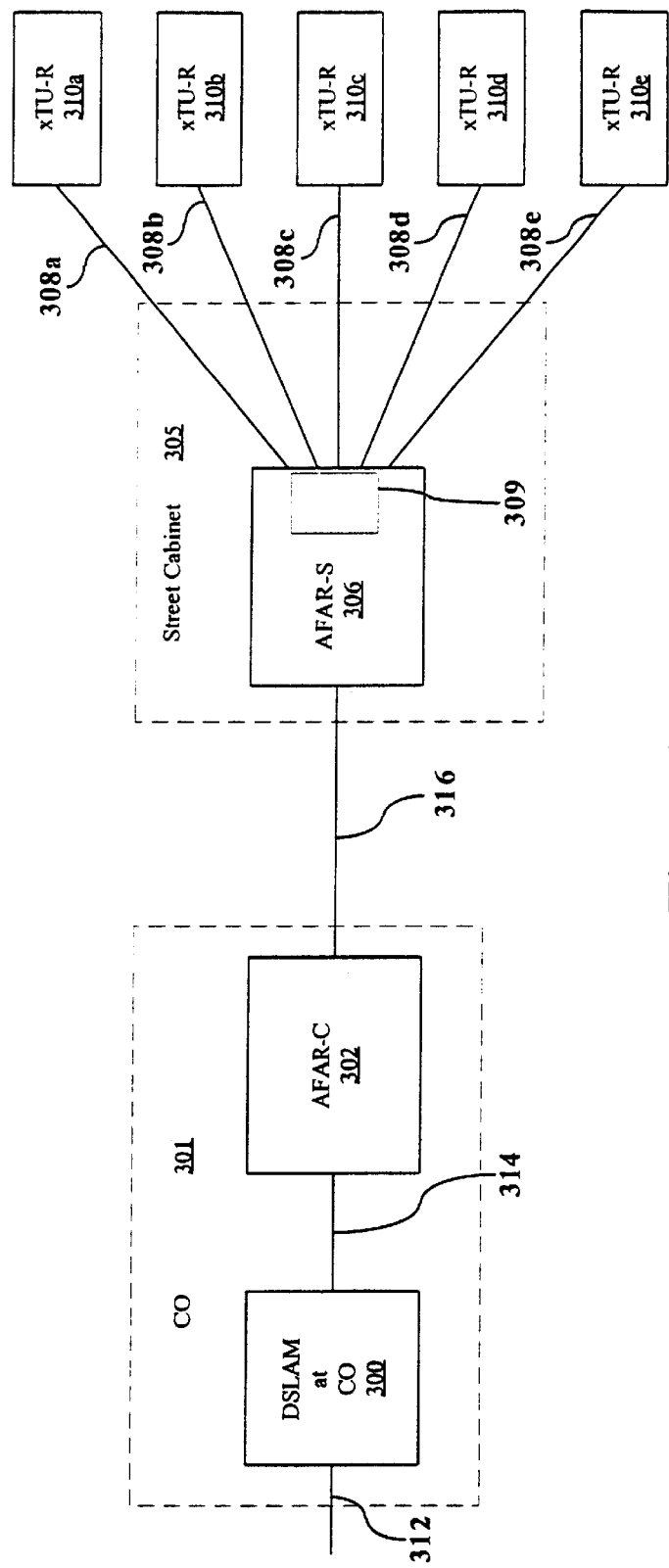
FIG. 3c illustrates the implementation of the embodiment that provides POTS service by using the fiber optic link and furthermore injects the required supply voltage.

An alternative implementation for utilizing the present invention in conjunction with traditional POTS services is illustrated in FIG. 3c. In this implementation, the POTS audio is transmitted over fiber link 316, in addition to the signaling information contained in the frequency components below 200 Hz. The DC power and appropriate voltages are supplied directly from a power source and appropriate circuitry 309 located with AFAR-S 306 at the street cabinet. In order to properly handle the high voltages associated with ringing, a high pass filter is utilized at AFAR-C 302 to decrease the lower frequency components' voltages to an acceptable level without distorting those frequency components above 200 Hz.

In addition, while the preferred embodiment of the present invention utilizes a fiber optic link between the AFAR-C and AFAR-S, it should be noted that any manner of broadband communications link is appropriate for communication of the frequency division multiplexed signal between the AFAR-C and AFAR-S. For instance, the fiber optic link is capable of being replaced by a microwave link or a free-space optical link, and still be within the spirit and scope of the present invention.

Conclusion

A system and method has been shown in the above which extend the range that general xDSL services can be provided, thus enabling additional subscribers to be reached with high data rates previously available only to users proximate to the CO. While various preferred embodiments and implementations have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by specific broadband link, location of the AFAR-S within a street cabinet, location of the AFAR-C within the CO or specific modulation techniques.

What is claimed is:

1. A system for transmitting data from a general-purpose network to a subcriber data unit using pairs of copper wire such as lines serving subscribers of the conventional telephone system over a distance greater than that generally allowed by said subscriber lines, said system comprising:

a general-purpose network-to-subscriber data unit interface, said interface receiving data from a general-purpose network and formatting it for transmission to said subscriber data unit;

a first broadband transceiver connected to said interface, said first broadband transceiver unit receiving said formatted data from said interface, a second broadband transceiver unit receiving said formatted data in a channel of one or more frequency division multiplexed signals transmitted from said first broadband transceiver via a broadband communication link, said second broadband transceiver removing said formatted data from said channel and transmitting said formatted data to said subscriber data unit via a subscriber line connected to said second broadband transceiver; and wherein said second broadband transceiver receives upstream data from said subscriber data unit via said subscriber line, said second broadband transceiver transmits said data in an upstream channel of a frequency division multiplexed signal to said first transceiver, said first transceiver removes said data from said upstream channel and transmits said data to said interface, said interface formats said data received from said first transceiver for transmission to said general-purpose network and said interface transmits said received data from said first transceiver to said general-purpose network.

2. The system for transmitting data, as per claim 1, wherein said general-purpose network-to-subscriber data unit interface is a DSL access multiplexer.

3. The system for transmitting data, as per claim 1, wherein said first broadband transceiver is a fiber optic transceiver.

4. The system for transmitting data, as per claim 1, wherein said broadband communications link is an optical fiber link.

5. The system for transmitting data, as per claim 1, wherein said second broadband transceiver is a fiber optic transceiver.

6. The system for transmitting data, as per claim 1, wherein said subscriber data unit is a subscriber xDSL modem.

7. The system for transmitting data, as per claim 1, said system further comprising:

a POTS (Plain Old Telephone Service) splitter connected between said second broadband transceiver and said subscriber data unit, said POTS splitter splitting POTS signals from xDSL signals, and wherein xDSL signals are transmitted to said interface via said second broadband transceiver, said first broadband transceiver and said broadband communication link and said POTS signals are transmitted to a Central Office of said Public Switched Telephone Network via legacy UTP (Unshielded Twisted Pairs) lines.

8. The system for transmitting data, as per claim 1, wherein POTS (Plain Old Telephone Service) signals are transmitted via said first transceiver, said broadband communications link and said second broadband transceiver.

9. The system for transmitting data, as per claim 1, wherein said interface is located at a Central Office of a Public Switched Telephone Network.

10. The system for transmitting data, as per claim 1, wherein said second broadband transceiver is located in a street cabinet of a Public Switched Telephone Network.

11. The system for transmitting data, as per claim 1, wherein channel bandwidth of said frequency division multiplexed signal is dynamically set.

12. The system for transmitting data, as per claim 11, wherein said channel bandwidth is set at said first broadband transceiver and said setting is communicated to said second broadband transceiver via a management protocol.

13. A The system for extending a distance that general DSL services are capable of providing between subscriber's premises and a Central Office, said system comprising:

a DSL access multiplexer located at said Central Office, said DSL access multiplexer receiving data from a general-purpose network, said DSL access multiplexer generating a plurality of electrical signals from said received data, each of said plurality of electrical signals representing a portion of said received data to be transmitted to a corresponding subscriber DSL modem;

a first fiber optic transceiver connected to said DSL access multiplexer, said first fiber optic transceiver receiving said plurality of electrical signals from said DSL access multiplexer, said first fiber optic transceiver constructing one or more frequency division multiplexed signals from said plurality of signals and transmitting said one or more frequency division multiplexed signals across an analog fiber optic link, a second fiber optic transceiver, said second fiber optic transceiver connected to said analog fiber optic link and receiving said one or more frequency division multiplexed signals, said second fiber optic transceiver reconstructing said plurality of electrical signals from said one or more frequency division multiplexed signals and providing each of said plurality of signals to said corresponding subscriber DSL modem via a subscriber line, and wherein upstream data is received by said second fiber optic transceiver from said subscriber DSL modems, said second fiber optic transceiver constructs one or more upstream frequency division multiplexed signals from said upstream data and transmits said one or more upstream frequency division multiplex signals to said first fiber optic transceiver via said analog fiber optic link, said first fiber optic transceiver reconstructs said upstream data and transmits said upstream data to said DSL access multiplexer, said DSL access multiplexer transmits said received upstream data to said general-purpose network.

14. The system for extending a distance that general DSL services are capable of providing between subscriber's premises and a Central Office, as per claim 14, said system further comprising:

a POTS (Plain Old Telephone Service) splitter connected between said second fiber optic transceiver and said subscriber DSL modems, said POTS splitter splitting POTS signals from xDSL signals, and wherein xDSL signals are transmitted to said access multiplexer via said second fiber optic transceiver, said first fiber optic transceiver and said analog fiber optic link and said POTS (Plain Old Telephone Service) signals are transmitted to said Central Office via legacy UTP (Unshielded Twisted Pairs) lines.

15. The system for extending a distance that general DSL services are capable of providing between subscribers' premises and a Central Office, as per claim 13, wherein POTS (Plain Old Telephone Service) signals are transmitted via said second fiber optic transceiver, said first fiber optic transceiver and said analog fiber optic link.

16. The system for extending a distance that general DSL services-are capble of providing between subscribers' premises and a Central Office, as per claim 13, wherein said second fiber optic transceiver is located in a street cabinet of a Public Switched Telephone Network.

17. The system for extending a distance that general DSL services are capable of being provided between subscribers' premises and a Central Office, as per claim 13, wherein channel bandwidth of said frequency division multiplexed signal is dynamically set.

18. The system for extending a distance that general DSL services are capable of providing between subscribers' premises and a Central Office, as per claim 17, wherein said channel bandwidth is set at first fiber optic transceiver and said setting is communicated to said second fiber optic transceiver via a management protocol.

19. A method of transmitting data received from a general-purpose network between a Central Office of a Public Switched Telephone Network and a subscriber's premises, said method comprising:
   receiving data from said general-purpose network;
   converting said data into a plurality of signals, each of said signals representing a portion of said received data to be transmitted to a corresponding subscriber's premises;
   generating at least one wideband frequency division multiplexed signal from said plurality of signals;
   transmitting said at least one frequency division multiplexed signal to a remote distribution point over a broadband communication link;
   reconstructing said plurality of signals at said remote distribution point from said at least one wideband frequency division multiplexed signals;
   transmitting each of said plurality of signals to said corresponding subscriber's premise from said remote distribution point, and
   wherein upstream data is received from said subscriber's premises and one or more upstream frequency division multiplexed signals are constructed from said upstream data and transmitted to said general-purpose network.

20. A system for transmitting data from a general-purpose network to subscribers using pairs of copper wire such as lines serving subscribers of the conventional telephone system over distances greater than that generally allowed by said subscriber lines, said system comprising:
   a centrally located broadband transceiver connected to pre-existing equipment and receiving the plurality of analog signals required to be transmitted to subscribers, said centrally located broadband transceiver combining said analog signals into one or more composite broadband analog signals by frequency domain multiplexing (FDM), said centrally located broadband transceiver then transmitting said composite broadband analog signal(s) in the downstream direction, and
   a downstream direction broadband communications link, and
   a remotely located broadband transceiver receiving said composite broadband analog signal(s) transmitted from said centrally located broadband transceiver via said downstream direction broadband communication link, said remotely located broadband transceiver reconstituting said plurality of analog signals and transmitting said analog signals required to be transmitted to the appropriate subscriber via said subscriber lines, and
   wherein upstream data is received from said subscribers and one or more upstream frequency division multiplexed signals are constructed from said upstream data and transmitted to said general-purpose network.

21. The system for transmitting data from a general-purpose network to subscribers using pairs of copper wire such as lines serving subscribers of the conventional telephone system over distances greater than that generally allowed by said subscriber lines, as per claim 20, wherein said analog signals are xDSL signals.

22. The system for transmitting data from a general-purpose network to subscribers using pairs of copper wire such as lines serving subscribers of the conventional telephone system over distances greater than that generally allowed by said subscriber lines, as per claim 20, wherein said centrally located pre-existing equipment is a DSL access multiplexer (DSLAM).

23. The system for transmitting data from a general-purpose network to subscribers using pairs of copper wire such as lines serving subscribers of the conventional telephone system over distances greater than that generally allowed by said subscriber lines, as per claim 20, wherein said upstream analog signals are generated by subscriber premises xDSL modems.

24. The system for transmitting data from a general-purpose network to subscribers using pairs of copper wire such as lines serving subscribers of the conventional telephone system over distances greater than that generally allowed by said subscriber lines, as per claim 20, wherein said analog signals are wireless signals.

25. The system for transmitting data from a general-purpose network to subscribers using pairs of copper wire such as lines serving subscribers of the conventional telephone system over distances greater than that generally allowed by said subscriber lines, as per claim 20, said system further comprising:
   POTS (Plain Old Telephone Service) splitters to separate POTS (Plain Old Telephone Service) signals from xDSL signals, and
   wherein xDSL signals are transmitted to said centrally located broadband transceiver via said broadband communication link and said POTS signals are transmitted to a Central Office of a Public Switched Telephone Network via legacy UTP (Unshielded Twisted Parts) lines.

26. The system for transmitting data from a general-purpose network to subscribers using pairs of copper wire such as lines serving subscribers of the conventional telephone system over distances greater than that generally allowed by said subscriber lines, as per claim 20, wherein POTS (Plain Old Telephone Service) signals are transmitted via said broadband communications link.

27. The system for transmitting data from a general-purpose network to subscribers using pairs of copper wire such as lines serving subscribers of the conventional telephone system over distances greater than that generally allowed by said subscriber lines, as per claim 20, wherein said centrally located broadband transceiver is located at a Central Office of a Public Switched Telephone Network.

28. The system for transmitting data from a general-purpose network to subscribers using pairs of copper wire such as lines serving subscribers of the conventional telephone system over distances greater than that generally allowed by said subscriber lines, as per claim 20, wherein said remotely located broadband transceiver is located in a street cabinet of a Public Switched Telephone Network.

29. The system for transmitting data from a general-purpose network to subscribers using pairs of copper wire such as lines serving subscribers of the conventional telephone system over distances greater than that generally allowed by said subscriber lines, as per claim 20, wherein channel bandwidth of said frequency division multiplexed signals is dynamically set.

30. The system for transmitting data from a general-purpose network to subscribers using pairs of copper wire such as lines serving subscribers of the conventional telephone system over distances greater than that generally allowed by said subscriber lines, as per claim 20, wherein said channel bandwidths are set at said centrally located broadband transceiver and said settings are communicated to said remotely located broadband transceiver via a management protocol.

31. A system for transmitting data from subsribers to a general-purpose data communication network using pairs of copper wire such as lines serving subscribers of the conventional telephone system over distances greater than that generally allowed by said subscriber lines, said system comprising:

a remotely located broadband transceiver unit receiving a plurality of analog signals from said subscribers via said subscriber lines, said remotely located broadband transceiver combining said analog signals into one or more composite broadband analog signals by frequency domain multiplexing (FDM), said remotely located broadband transceiver then transmitting said composite broadband analog signal(s) in the upstream direction, and an upstream direction broadband communication link, and a centrally located broadband transceiver unit receiving said composite broadband analog signal(s) transmitted from said remotely located broadband transceiver via said upstream direction broadband communications link, said centrally located broadband transceiver reconstituting said plurality of analog signals and delivering said analog signals to pre-existing equipment for delivery to said general-purpose data communications network, and wherein upstream data is received from subscriber's premises and one or more upstream frequency division multiplexed signals are constructed from said upstream data and transmitted to said general-purpose network.

* * * * *

UNITED STATES PATENT AND TRADEMARK OFFICE
CERTIFICATE OF CORRECTION

PATENT NO. : 6,829,246 B2
DATED : December 7, 2004
INVENTOR(S) : H. Silberman et al.

It is certified that error appears in the above-identified patent and that said Letters Patent is hereby corrected as shown below:

<u>Title page,</u>
Item [75], should read as follows:
-- [75] Inventors: Hugo Silberman, Kefar Sirkin (IL);
Tsvi (Henri) Eitane, Netanya (IL);
Yaakov Stein, Jerusalem (IL) --

Signed and Sealed this

Twenty-sixth Day of April, 2005

JON W. DUDAS
*Director of the United States Patent and Trademark Office*